R. ANDREU.
MEANS FOR PROPELLING MARINE VESSELS.
APPLICATION FILED JAN. 19, 1918.

1,296,352.

Patented Mar. 4, 1919.

Witnesses:
William W. Tuck
Dorothy Miatt

Inventor:
Rafael Andreu,
By his Attorney,
Geo. Wm. Miatt

UNITED STATES PATENT OFFICE.

RAFAEL ANDREU, OF NEW YORK, N. Y.

MEANS FOR PROPELLING MARINE VESSELS.

1,296,352. Specification of Letters Patent. Patented Mar. 4, 1919.

Application filed January 19, 1918. Serial No. 212,593.

*To all whom it may concern:*

Be it known that I, RAFAEL ANDREU, a citizen of Cuba, residing in the borough of Manhattan, city, county, and State of New York, have invented certain new and useful Improvements in Means for Propelling Marine Vessels, of which the following is a specification.

The object of my invention is to afford means whereby the speed and stability of power propelled marine vessels may be materially augmented in a simple and effective manner, the invention consisting essentially in the peculiar positioning of a plurality of auxiliary propellers with relation to the keel and mean water line of the vessel to which they are applied, all as hereinafter described and claimed specifically.

In the accompanying drawings.

Figure 1:
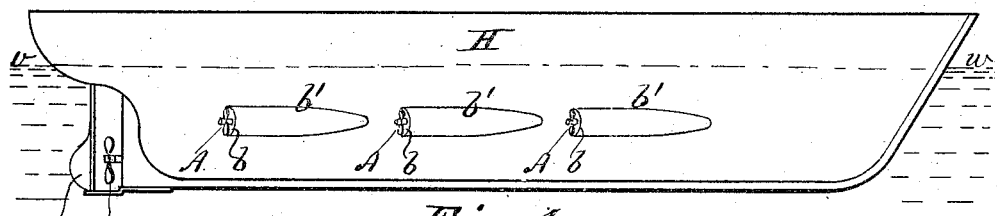
Figure 1, is a diagrammatic representation of a side elevation of a vessel of the propeller type provided with my improvements.
Figure 2:
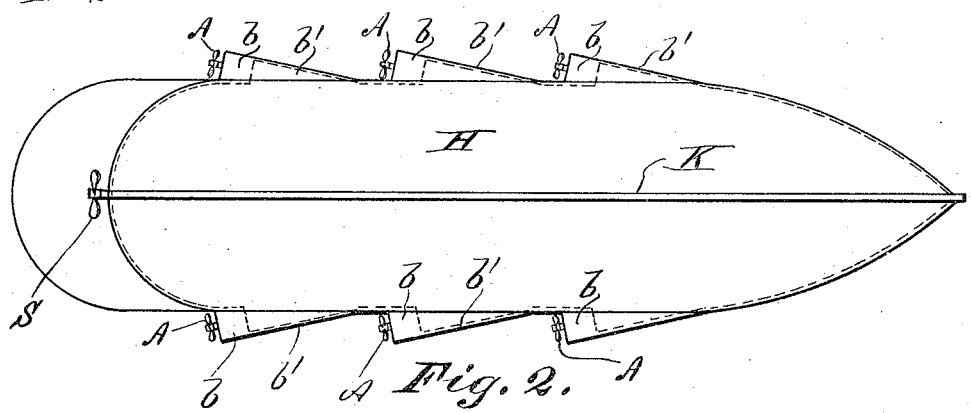
Fig. 2, is a view of the under side thereof.
Figure 3:
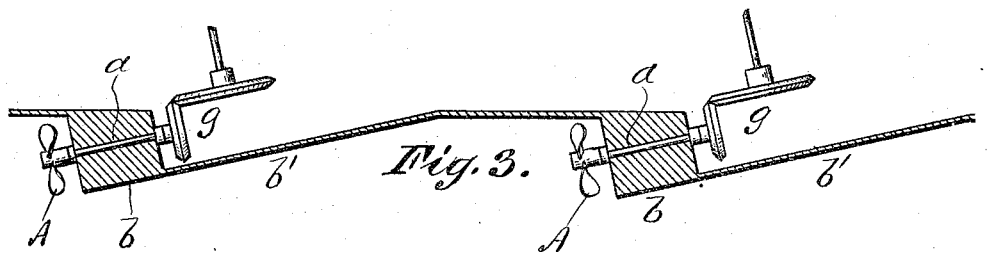
Fig. 3, is a sectional detail on a larger scale showing an auxiliary propeller mount.
Figure 4:
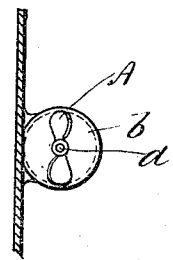
Fig. 4, is a short section of the hull taken just in the rear of one of the auxiliary propeller mounts.

In Figs. 1 and 2, the hull (H) of any ordinary stern propeller craft is shown diametrically, K, representing the keel, R, the rudder; S, the usual stern propeller, and *w*, *w*, the mean water line.

My auxiliary propellers A, A, are arranged in alinement parallel to the keel K, and the mean water level *w*, *w*, and in proximate medial relation thereto. Any number of these auxiliary propellers A, may be arranged on each side of the hull H, preferably a plural number, dependent upon the length of the vessel and the speed desired.

In the present case the shaft *a*, of each auxiliary propeller A, is mounted in a protuberant bearing *b*, the outer extremity of which is preferably circular in cross section and of greater diameter than the circle circumscribed by the blades of the propeller A, which it supports. In other words the blades of the auxiliary propellers do not protrude beyond their bearings *b*, and hence cannot drag or retard the speed of the vessel, as they act only on the water behind said bearings *b*,—it being understood that the auxiliary propellers A, operate normally in unison with the stern propeller S, to displace the circumambient water toward the rear of the vessel, or rather to force the vessel bow-first through the same. In this connection it may be stated that the auxiliary propellers A, on account of the number thereof, and the purpose for which they are used, need not be as large in radius as the stern propeller,—and hence their radial blades may be kept within the circumference of their shaft bearings as before stated.

The auxiliary propellers A, A, are actuated by any suitable or well known power, and by any suitable mechanical expedients, the latter being represented symbolically in the drawings by the miter gears *g*.

The outer faces of the propeller shaft bearings *b*, are inclined approximately at right angles to the sides of the hull H, and in each case the adjacent casing *b'*, is tapered uniformly and convergently forward, gradually merging into the hull H, so that the displacement of water by said casing will be gradual because of the presentation of a minimum of surface resistance to the forward thrust of the vessel. And, for a like reason the auxiliary propeller blades, as before stated, do not protrude beyond the rear faces of their bearings, their action being confined entirely to the displacement of the water flowing to the rear of said bearings.

Obviously the arrangement of a plurality of these auxiliary propellers on each side of the hull, well below the mean water line, and in parallelism with the keel and stern propeller shaft, will increase the purchase or hold of the vessel on the water in proportion to the number provided, so that in operation the tendency of the vessel to rock or roll under surface disturbance of the water will be diminished, while the speed of the vessel may be materially increased,—so much so as to render the vessel practically immune from attack by submarine or torpedo. Furthermore when applied to war craft the steadiness of equilibrium attained greatly facilitates the accurate aiming of ordnance of all kinds, either for practice or actual service; while in mercantile marine and passenger service, seasickness and discomfort will be practically eliminated for passengers. And the increased speed attainable will also obviate other dangers of navigation by shortening the time between ports.

What I claim as my invention and desire to secure by Letters Patent is,

In marine craft of the character designated, a plurality of auxiliary propellers on each side of the hull arranged in alinement and in parallelism with the keel and the mean water line, and in approximate medial relation thereto, the shaft of each auxiliary propeller being journaled in a bearing protuberant beyond the side of the hull and of a diameter sufficient to include the radial extension of the propeller blades, and the casing of the bearing merging gradually and uniformly into the hull, for the purpose described.

RAFAEL ANDREU.

Witnesses:
GERARDO ANDREW,
GEO. WM. MIATT.

Copies of this patent may be obtained for five cents each, by addressing the "Commissioner of Patents, Washington, D. C."